United States Patent
Liao

(10) Patent No.: US 8,215,812 B2
(45) Date of Patent: Jul. 10, 2012

(54) LED VEHICLE CORNERING LAMP

(75) Inventor: Jiahong Liao, Shenzhen (CN)

(73) Assignee: Shenzhen Anhuaxin S&T Development Co., Ltd (CN)

( * ) Notice: Subject to any disclaimer, the term of this patent is extended or adjusted under 35 U.S.C. 154(b) by 118 days.

(21) Appl. No.: 12/710,867

(22) Filed: Feb. 23, 2010

(65) Prior Publication Data

US 2011/0121729 A1    May 26, 2011

(30) Foreign Application Priority Data

Nov. 24, 2009  (CN) .................. 2009 2 0260734 U

(51) Int. Cl.
*B60Q 3/00* (2006.01)

(52) U.S. Cl. ............. 362/507; 362/249.02; 362/545

(58) Field of Classification Search .......... 362/240, 362/249.01, 249.02, 473, 475, 507, 518, 362/538, 539, 540–547, 37; 701/36
See application file for complete search history.

(56) References Cited

U.S. PATENT DOCUMENTS

| | | | | |
|---|---|---|---|---|
| 6,390,643 B1* | 5/2002 | Knight | ............... | 362/249.03 |
| 6,450,663 B1* | 9/2002 | Reinbach | ............... | 362/545 |
| 7,004,603 B2* | 2/2006 | Knight | ............... | 362/249.03 |
| 7,188,984 B2* | 3/2007 | Sayers et al. | ............... | 362/545 |
| 7,204,628 B2* | 4/2007 | Ishida | ............... | 362/545 |
| 7,427,151 B2* | 9/2008 | Okubo et al. | ............... | 362/545 |
| 8,090,498 B2* | 1/2012 | Ueno | ............... | 701/36 |
| 2002/0118548 A1* | 8/2002 | Kuenstler et al. | ............... | 362/518 |

FOREIGN PATENT DOCUMENTS

JP    2000156105 A  *  6/2000

* cited by examiner

*Primary Examiner* — Hargobind S Sawhney
(74) *Attorney, Agent, or Firm* — Garcia-Zamor IP Law; Ruy M. Garcia-Zamor

(57) ABSTRACT

The invention discloses a LED vehicle cornering lamp, including a metal lamp holder, wherein the metal lamp holder is equipped with inward cavity, and in the bottom of the cavity has a sloping bench for the installation of the luminous body, which is to turn the luminous body into the lateral directions during steering maneuvers; a LED luminous body at least, which is installed in the sloping bench inside the cavity of the metal lamp holder, wherein the luminous body connects with a controller while the controller controls the make-and-break of the LED luminous body; a reflector corresponding to the luminous body, wherein the reflector collects the light from the LED luminous body and lightens the lateral direction of the vehicle after reflection; a transparent protection cover, wherein the protection cover is liquid-tight assorted with the metal lamp holder port. The LED vehicle cornering lamp of the invention could be easily installed in the front of the vehicle, and lighten the road of lateral directions by using the auxiliary lamp installed in forward direction by the sloping bench inside the metal lamp holder, so as to decrease the blind area when changing directions during the night and enhance the safety when driving at night; furthermore, the utility mode has merits with simple structure, low cost and is suitable to be universalized in all vehicles.

7 Claims, 4 Drawing Sheets

LED VEHICLE CORNERING LAMP

TECHNICAL FIELD

The invention relates to a lamp for vehicle, especially refers to a LED vehicle cornering lamp.

BACKGROUND ART

Currently, with the development of the living standard of the people, it is popular to have a car for common people and family. However, most of the vehicles are only equipped with head lighting to lighten the road ahead and assure the safety when driving at night; when the vehicle is changing directions, it is easy to have visual blind area in the side directions, which leads to traffic accidents. Therefore, we are aware of the importance of the vehicle cornering lamps. The vehicle cornering lamps in current technology, is usually placed in the head lighting set, and powered by the orientation induction system of the vehicle, illuminating thereof. Due to the high production cost of this headlight, it is only equipped with small number of high-level vehicles, and it is very hard to be universalized in the low-level vehicles.

CONTENTS OF THE INVENTION

To overcome the shortage of the current technology, this invention is to provide a LED vehicle cornering lamp with simple structure, long lifespan, easy to install and low cost.

For achieving the objective above, this invention adopts the following technical solutions:

A LED vehicle cornering lamp, including:

A metal lamp holder, wherein the metal lamp holder is equipped with inward cavity, and in the bottom of the cavity has a sloping bench for the installation of the luminous body, which is to turn the luminous body into the lateral directions during steering maneuvers;

A luminous body at least, wherein the luminous body is a large power LED chip, which is installed in the sloping bench inside the cavity of the metal lamp holder and powered by the drive circuit board, illuminating thereof;

A reflector corresponding to the luminous body wherein the reflector collects the light from the LED luminous body and lightens the lateral direction of the vehicle after reflection;

Transparent protections cover, wherein the protection cover is liquid-tight assorted with the metal lamp holder port.

The foresaid controller includes a processor and an angular velocity sensor, wherein the angular velocity sensor detects the angular velocity signal of vehicle steering, and transmits the signal to LED drive circuits to control the make-and-break of the LED luminous body.

When the vehicle is driving, the angular velocity sensor detects the angular velocity signal of vehicle steering, and transmits to the processor; when the processor detects an angular velocity signal that exceeds the set point value, it means that the vehicle is turning, meantime the processor will decide whether to turn on the corresponding cornering lamp according to the original state of the lighting system of the vehicle.

The foresaid reflector has a corresponding inner lens hood to prevent the reversion of the light from the LED luminous body.

The foresaid metal lamp holder is made by the aluminum alloy, wherein the bottom of cavity has three parallel sloping benches, and the sloping benches and the metal lamp holder are jointless at 22.5 degree included angle, while in the bottom of the metal lamp holder has a plate-shaped heat abstractor.

There are three foresaid luminous body, which are installed in three sloping bench separately, and are powered by the drive circuit board insider the cavity of the metal lamp holder, illuminating thereof.

The foresaid transparent protections cover has a flat transparent part, a fixed part which is located in both ends of the flat transparent part and corresponding to the shape of the head face of the metal lamp holder, and a circular orientation sealing part which is embedded in the port of the cavity of the metal lamp holder, wherein the transparent protection cover is fixed joint with the metal lamp holder by the through hold in the fixed part and the bolt that penetrated through the hole.

The foresaid orientation sealing part has circular groove to hold the sealing ring, wherein the sealing right is located in the circular groove and has a liquid-tight manner connection with the inner surface of the cavity of the metal lamp holder.

Both sides and the rear of the foresaid metal lamp holder have clamps separately in order to easily install the LED vehicle cornering lamp into the vehicle.

The foresaid metal lamp holder has a through hole in the side near to the drive circuit board, and a water-proof cable joint box is located in the through hold and liquid-tightly connected with the metal lamp holder.

By adopting the above structure, the cornering lamp of the invention could be easily installed in front of the vehicle, and lighten the road of lateral directions by using the auxiliary lamp installed in forward direction by the sloping bench inside the metal lamp holder, so as to decrease the blind area when changing directions during the night and enhance the safety when driving at night; furthermore, the lifespan of the large power LED chip is prolong, because the metal lamp holder is made by the aluminum alloy, and the sloping bench and the metal lamp holder is jointless, and in the bottom of the metal lamp holder has a plate-shaped heat abstractor to enhance the thermal performance. The utility mode has merits with simple structure, low cost and is suitable to all vehicles.

MODE OF CARRYING OUT THE INVENTION

Figure 1:
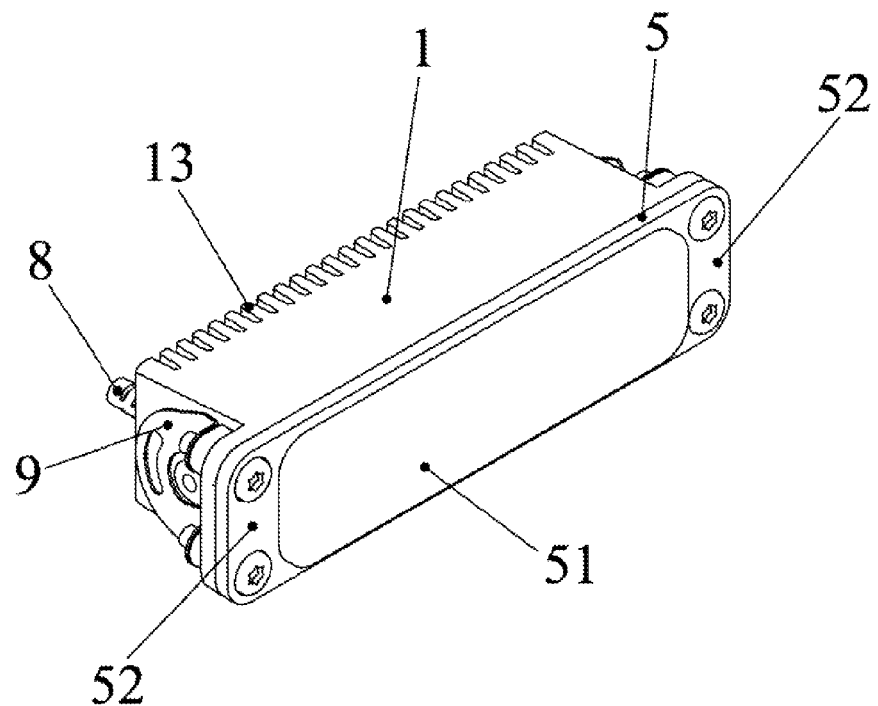
FIG. 1 is the structure view of the invention.
Figure 2:
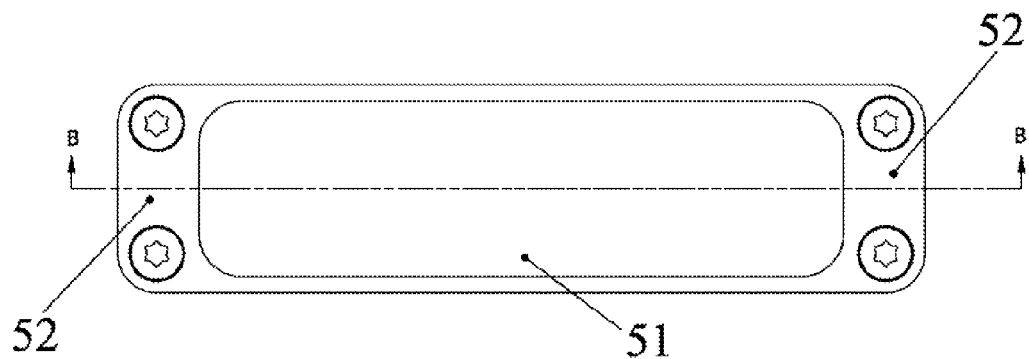
FIG. 2 is the structure view from the bottom of the invention.
Figure 3:
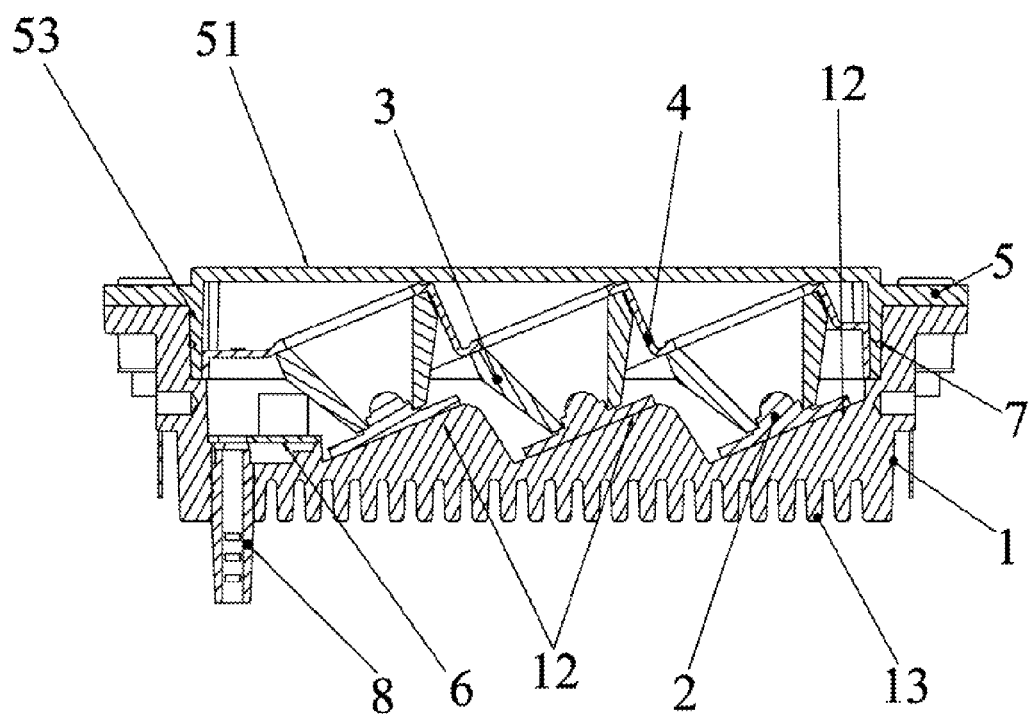
FIG. 3 is the B-B cutaway view of the FIG. 2.
Figure 4:
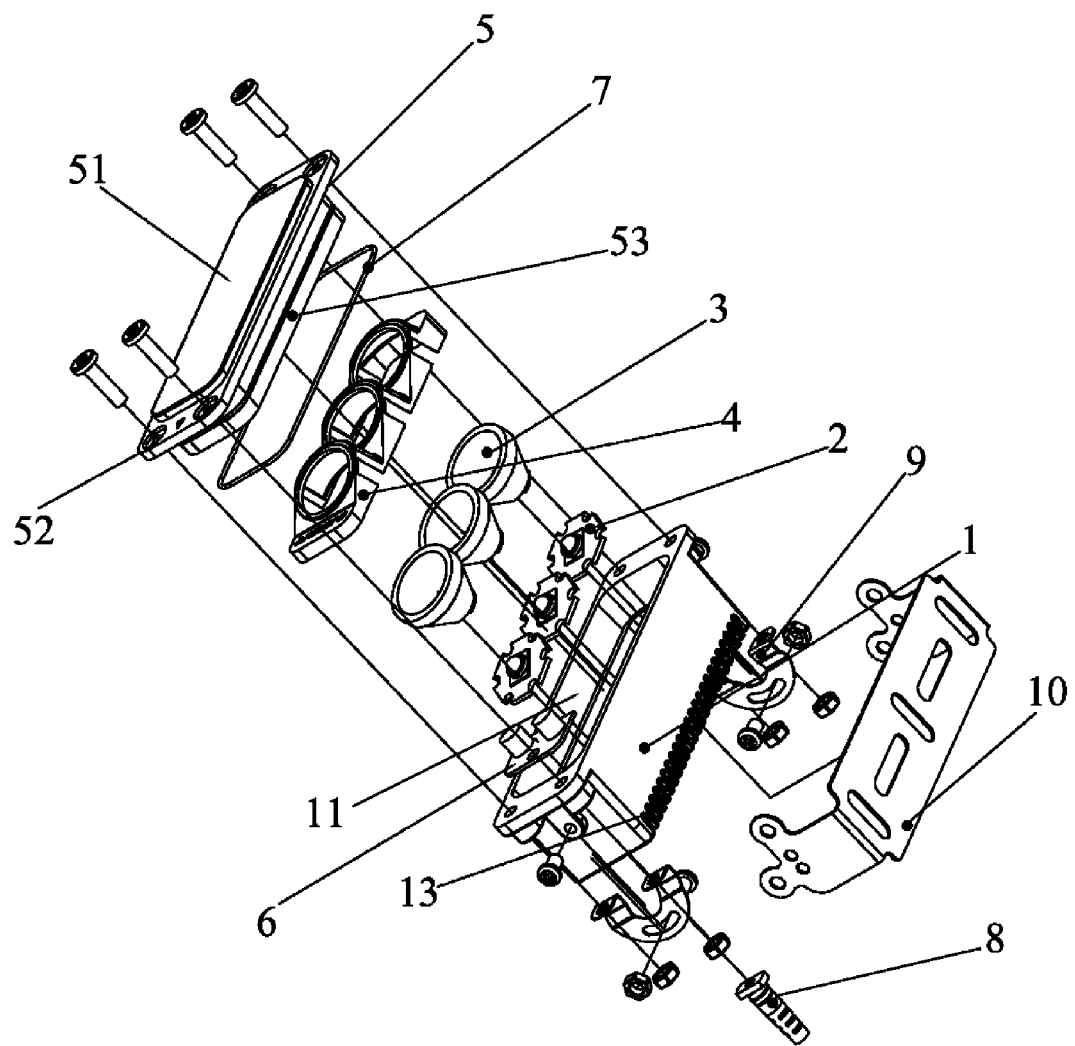
FIG. 4 is the exploded view of the invention.

Further explanation to the invention is stated below combining with the attached figures:

As shown from FIG. 1 to FIG. 4, a LED vehicle cornering lamp, including metal lamp holder 1, luminous body 2, reflector 3, inner lens hood 4 and transparent protection cover 5. The metal lamp holder 1 is made by the aluminum alloy, wherein the metal lamp holder is equipped with inward cavity 11, and in the bottom of the cavity 11 has three sloping benches 12 for the installation of the luminous body, and the sloping benches 12 and the metal lamp holder 1 are jointless at 22.5 degree included angle, while in the bottom of the metal lamp holder 1 has a plate-shaped heat abstractor 13; both sides and the rear of the metal lamp holder 1 has side clamp 9 and rear clamp 10 to easily install the LED vehicle cornering lamp into the vehicle, furthermore, the metal lamp holder 1 has a through hole in the side near to the drive circuit board, and a water-proof cable joint box 8 is located in the through hold and liquid-tightly connected with the metal lamp holder 1. The luminous body 2 is a large power LED chip, there are three of them, which are installed in three sloping bench 12 separately, and are powered by the drive circuit board 6 insider the cavity 11, illuminating thereof. A conical reflector 3 corresponding to the luminous body wherein the reflector 3 collects the light from the LED luminous body and lightens the lateral direction of the vehicle after reflection; to prevent the reversion of the light, an inner lens hood 4 is placed in the side end of the reflector.

The transparent protections cover 5 has a flat transparent part 51, a fixed part 52 which is located in both end of the flat transparent part and corresponding to the shape of the head face of the metal lamp holder, and a circular orientation sealing part 53 which is embedded in the port of the cavity of the metal lamp holder, wherein the transparent protection cover 5 is fixed joint with the metal lamp holder 1 by the through hold in the fixed part 52 and the bolt that penetrated through the hole. The orientation sealing part 53 has circular groove to hold the sealing ring 7, wherein the sealing right 7 is located in the circular groove and liquid-tightly connected with the inner surface of the cavity 11 of the metal lamp holder.

Figure 5:
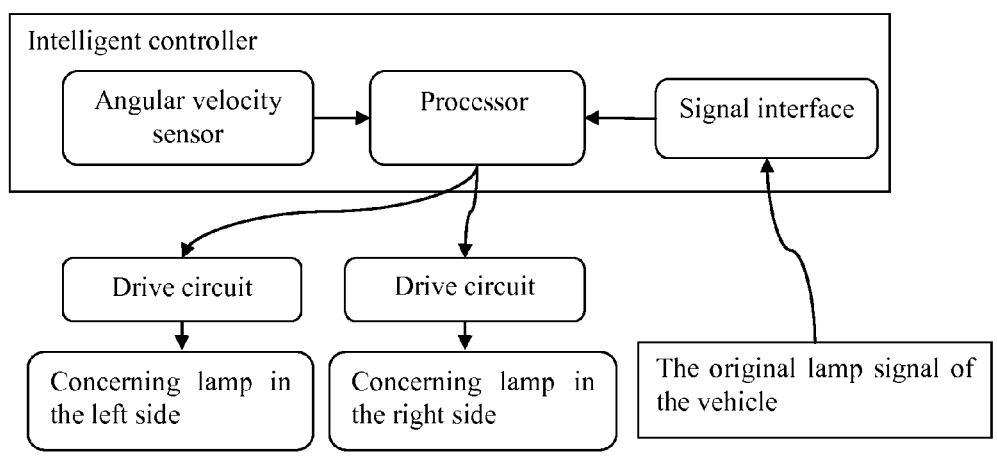
FIG. 5 is the control principle diagram of the invention.

As shown in FIG. 5, the controller includes a processor and an angular velocity sensor, wherein the input end of the processor respectively connects with the original lamp signal of the vehicle and the angular velocity sensor; the processor output respectively connects with the LED cornering lamps in the left and right sides by the drive circuits; when the vehicles are driving, the angular velocity sensor detects the angular velocity signal of vehicle steering, and transmits to the processor; when the processor detects an angular velocity signal that exceeds the set point value, it means that the vehicle is turning, meantime the processor will decide whether to turn on the corresponding cornering lamp according to the original state of the lighting system of the vehicle. For example, when the vehicle is turning left and its high beam is on, the LED cornering lamps in the left side will automatically turn on and illuminate the inside of the road, and it will continues to illuminate for five seconds after the vehicle return to straight-through direction

What is claimed is:

1. A LED vehicle cornering lamp, comprising:
   a metal lamp holder defining a cavity therein, a bottom of the cavity forms a sloping bench configured for the installation of a luminous body thereon, the LED vehicle cornering lamp being configured to turn on the luminous body during vehicle turns;
   the luminous body is disposed on the sloping bench inside the cavity of the metal lamp holder, the luminous body connects with a controller configured to operate the luminous body during vehicle turns;
   a reflector disposed about the luminous body and configured to collect light from the luminous body and increase illumination in a lateral direction of the vehicle using reflection;
   a transparent protection cover engaged in a liquid-tight manner with the metal lamp holder, the metal lamp holder comprises aluminum alloy, wherein the bottom of the cavity has three parallel sloping benches, and the three parallel sloping benches and the metal lamp holder are jointless at a twenty two point five (22.5) degree included angle, a bottom of the metal lamp holder has a plate-shaped heat abstractor.

2. A LED vehicle cornering lamp as set forth in claim 1, characterized in that the reflector has a corresponding inner lens hood to prevent the reversion of the light from the LED luminous body.

3. A LED vehicle cornering lamp as set forth in claim 1, characterized in that there are three luminous body, which are installed in three sloping bench separately, and are powered by the drive circuit board insider the cavity of the metal lamp holder, illuminating thereof.

4. A LED vehicle cornering lamp, comprising:
   a metal lamp holder defining a cavity therein, a bottom of the cavity forms a sloping bench configured for the installation of a luminous body thereon, the LED vehicle cornering lamp being configured to turn on the luminous body during vehicle turns;
   the luminous body is disposed on the sloping bench inside the cavity of the metal lamp holder, the luminous body connects with a controller configured to operate the luminous body during vehicle turns;
   a reflector disposed about the luminous body and configured to collect light from the luminous body and increase illumination in a lateral direction of the vehicle using reflection;
   a transparent protection cover engaged in a liquid-tight manner with the metal lamp holder, the transparent protection cover has a flat transparent part, a fixed part which is located in both ends of the flat transparent part and corresponding to a shape of a head face of the metal lamp holder, and a circular orientation sealing part which is embedded in a port of the cavity of the metal lamp holder, wherein the transparent protection cover is fixed joint with the metal lamp holder by a through hold defined in the fixed part and a bolt positioned therethrough.

5. A LED vehicle cornering lamp as set forth in claim 4, characterized in that the orientation sealing part has circular groove to hold the sealing ring, wherein the sealing right is located in the circular groove and has a liquid-tight manner connection with the inner surface of the cavity of the metal lamp holder.

6. A LED vehicle cornering lamp, comprising:
   a metal lamp holder defining a cavity therein, a bottom of the cavity forms a sloping bench configured for the installation of a luminous body thereon, the LED vehicle cornering lamp being configured to turn on the luminous body during vehicle turns;
   the luminous body is disposed on the sloping bench inside the cavity of the metal lamp holder, the luminous body connects with a controller configured to operate the luminous body during vehicle turns, wherein the controller includes a processor and an angular velocity sensor, the angular velocity sensor being configured to detect an angular velocity signal resulting from vehicle steering and transmits the angular velocity signal to an LED drive circuit to control the operation of the luminous body;
   a reflector disposed about the luminous body and configured to collect light from the luminous body and increase illumination in a lateral direction of the vehicle using reflection; and
   a transparent protection cover engaged in a liquid-tight manner with the metal lamp holder, wherein both sides and the rear of the metal lamp holder has clamps separately in order to easily install the LED vehicle cornering lamp into the vehicle.

7. A LED vehicle cornering lamp as set forth in claim 6, characterized in that the metal lamp holder has a through hole in the side near to the drive circuit board, and a water-proof cable joint box is located in the through hold and liquid-tightly connected with the metal lamp holder.

* * * * *